(12) United States Patent
Vetrovec

(10) Patent No.: US 7,532,652 B2
(45) Date of Patent: May 12, 2009

(54) LASER THERMAL MANAGEMENT SYSTEMS AND METHODS

(75) Inventor: Jan Vetrovec, Larkspur, CO (US)

(73) Assignee: The Boeing Company, Chicago, IL (US)

( * ) Notice: Subject to any disclaimer, the term of this patent is extended or adjusted under 35 U.S.C. 154(b) by 57 days.

(21) Appl. No.: 11/676,898

(22) Filed: Feb. 20, 2007

(65) Prior Publication Data

US 2008/0198883 A1 Aug. 21, 2008

(51) Int. Cl.
*H01S 3/04* (2006.01)
(52) U.S. Cl. .............................. 372/34; 372/35; 372/90
(58) Field of Classification Search .................... 372/34, 372/35, 90
See application file for complete search history.

(56) References Cited

U.S. PATENT DOCUMENTS

| 3,348,093 | A | 10/1967 | Holly |
| 3,852,755 | A | 12/1974 | Works et al. |
| 3,869,870 | A | 3/1975 | Kuehner |
| 3,919,638 | A | 11/1975 | Belden Jr. |
| 4,237,428 | A | 12/1980 | Wexler et al. |
| 4,388,044 | A | 6/1983 | Wilkinson |
| 4,586,185 | A | 4/1986 | DeWilde et al. |
| 4,634,968 | A | 1/1987 | Aslan |
| 4,638,813 | A | 1/1987 | Turner |
| 4,807,242 | A | 2/1989 | Kim |
| 5,030,962 | A | 7/1991 | Rees |
| 5,105,428 | A | 4/1992 | Pocholle et al. |
| 5,233,263 | A | 8/1993 | Cronin et al. |
| 5,308,439 | A | 5/1994 | Cronin et al. |
| 5,420,595 | A | 5/1995 | Zhang et al. |
| 5,477,706 | A | 12/1995 | Kirol et al. |
| 5,499,313 | A | 3/1996 | Kleinerman |
| 5,846,638 | A | 12/1998 | Meissner |
| 5,856,803 | A | 1/1999 | Pevler |
| 6,195,372 | B1 | 2/2001 | Brown |

(Continued)

FOREIGN PATENT DOCUMENTS

GB 2121612 12/1983

(Continued)

OTHER PUBLICATIONS

B. Maytel, "Performance of ideal flow regulated joule-Thomasn cryocooler" Cryogenics 1994 vol. 34, No. 9, pp. 723-726.

(Continued)

*Primary Examiner*—Dung T Nguyen
(74) *Attorney, Agent, or Firm*—Haynes and Boone, LLP

(57) ABSTRACT

A laser system thermal management system includes a laser gain assembly and a thermal management assembly. The laser gain assembly includes a laser gain medium and may include laser pump diodes. The thermal management system includes a high pressure gas tank connected to an open-cycle Joule-Thompson refrigerator. Cooled and partially liquefied gas is introduced into a reservoir. The reservoir may be in good direct thermal contact with the laser gain assembly or via a closed loop recirculating fluid heat exchanger. The heat generated by the laser gain assembly is removed by heat exchange with the cooled gas and condensate in the reservoir either by direct thermal contact or via the recirculating heat exchanger loop. Gas evaporating in the reservoir is vented.

21 Claims, 2 Drawing Sheets

U.S. PATENT DOCUMENTS

| | | |
|---|---|---|
| 6,307,871 B1 | 10/2001 | Heberle |
| 6,492,957 B2 | 12/2002 | Carillo, Jr. et al. |
| 6,605,808 B2 | 8/2003 | Mickan et al. |
| 6,864,825 B2 | 3/2005 | Holly |
| 6,943,742 B2 | 9/2005 | Holly |
| 6,950,076 B2 | 9/2005 | Holly |
| 6,999,041 B2 | 2/2006 | Holly |
| 7,009,575 B2 | 3/2006 | Holly et al. |
| 7,058,100 B2 | 6/2006 | Vetrovec |
| 7,122,813 B2 | 10/2006 | Linfield et al. |
| 7,142,147 B2 | 11/2006 | Holly |
| 2002/0075189 A1 | 6/2002 | Carillo, Jr. et al. |
| 2003/0198264 A1* | 10/2003 | Vetrovec et al. ............... 372/35 |
| 2004/0008149 A1 | 1/2004 | Killen et al. |
| 2004/0069454 A1 | 4/2004 | Bonsignore et al. |
| 2004/0141539 A1 | 7/2004 | Delgado, Jr. et al. |
| 2005/0088358 A1 | 4/2005 | Larry et al. |
| 2005/0259704 A1 | 11/2005 | Goto et al. |

FOREIGN PATENT DOCUMENTS

| | | |
|---|---|---|
| JP | 01101006 | 4/1989 |
| JP | 2006211637 | 8/2006 |
| WO | 03019738 | 3/2003 |
| WO | 2005093904 | 10/2005 |

OTHER PUBLICATIONS

B. Maytel, "Theremodynamic analysis of mixed fluid Joule-Thomason Cryocooler" Cryogenics 1991 pp. 111-135.

* cited by examiner

LASER THERMAL MANAGEMENT SYSTEMS AND METHODS

CROSS-REFERENCE TO RELATED APPLICATIONS

This application is related to U.S. Pat. No. 7,058,100 filed Apr. 18, 2002, application Ser. No. 10/124,911 and application Ser. No. 11/269,999, filed Nov. 9, 2005, both of which are incorporated herein by reference in their entirety.

TECHNICAL FIELD

The present disclosure relates generally to thermal management systems for high-average power lasers.

BACKGROUND

There is a need for systems and methods of rejection of heat developed by lasers during operation. In particular, highly mobile, lightweight laser systems require energy efficient, compact heat transfer technology that is rugged.

For example, high-average power (HAP) solid-state lasers (SSL) are finding increasingly important utility in defense and contractors are now developing HAP-SSL for use in anti-missile defense, especially against artillery rockets and projectiles. Such HAP-SSL systems may be mounted on mobile platforms such as land vehicles, ships and aircraft. Mobile HAP-SSL may also address specialty industrial applications, including dismantlement of nuclear facilities, drilling of oil wells and road tunnels, and spacecraft orbit transfer.

Heat rejection in a laboratory SSL is typically accomplished by a conventional thermal management system (TMS) that uses two thermally coupled closed loops; a primary loop having a vapor compression-type heat pump rejecting heat to the environment (air or utility water) and a secondary loop with a recirculating liquid coolant. Such TMSs are large, heavy, expensive, and require large motive power to operate. These limitations make them unsuitable for use in military HAP-SSL applications, where rejection of large amount of heat is required promptly on demand.

Liquid nitrogen ($LN_2$) may be also used as an expendable coolant since it can be readily evaporated and it is environmentally compatible. However, $LN_2$ is storable for extended periods of time only if refrigeration is provided, which is impractical for many military systems. Ammonia and freons readily boil at ambient temperature and are storable. However, they are not environmentally acceptable. The liquid TMS noted above requires tanks with liquid coolant which are suitable for land vehicles and ships but, due to their size, weight and sensitivity to g-forces may be less suitable for aircraft platforms.

SSLs extract coherent light from an inverted population of excited neodymium, ytterbium, or other suitable lasant ions doped into crystals or glass. Population inversion is achieved by optically exciting lasant ions by absorption of optical radiation at wavelengths shorter than the laser wavelength. This process is commonly referred to as "pumping." Depending on the excitation source and the lasant ions used, considerable portion (typically 10 to 50%) of the optical pump radiation is converted into heat and deposited into the SSL gain medium. For continuous operation, waste heat must be removed in real time by cooling selected surfaces of the laser medium. In addition, the source of optical pump radiation (typically semiconductor diodes) may also require cooling. Electro-optical efficiency of semiconductor diode for pumping SSLs is typically about 35-56%, where the balance is heat that must also be removed.

As a result, for every Joule of laser energy produced in a HAP-SSL, 2 to 6 Joules of heat must be removed from the laser. Thus, using a HAP-SSL generally includes the requirement to remove significant quantities of heat.

It is well known in the art that operating SSL materials and pump diodes at sub-ambient temperatures greatly improves device efficiency and improves thermo-mechanical/thermo-optical properties. In particular, at low temperature many important laser materials experience increased thermal conductivity, reduced coefficient of thermal expansion, and a reduced thermal dispersion coefficient ($dn/dT$), where n is the index of refraction and T is the temperature. Conventional refrigeration systems can be used to operate SSLs at sub-ambient temperature, but their size, weight and need for motive power make them unsuitable for certain applications, e.g., military HAP-SSL.

It is worthwhile to note that household refrigerators use a closed-cycle Joule-Thompson process. However, open-cycle Joule-Thompson cryogenic coolers are used in many commercial and military applications to reduce weight and power requirements. Innovations in the last decade include high efficiency heat exchangers fabricated by photolithography and the use of mixtures of gases rather than pure gases.

Photolithographically produced heat exchangers are characterized by their small size, low thermal mass, and low cost. Owing to their low thermal mass, these heat exchangers have demonstrated a capability for rapid cool-down from ambient to 80 degrees Kelvin in several seconds.

The most frequently used gases in Joule-Thompson cryogenic coolers are nitrogen or argon. However, recent experiments have demonstrated that mixing a small amount of high boiling point gases such as ethane, penthane or propane with nitrogen or argon may increase the Joule-Thompson refrigeration effect by a factor of 2 to 10. In addition, adding a small amount of Halon™ ($CBrF_3$) renders the mixture non-flammable. For example, the integral iso-enthalpic refrigeration effect produced at 80 degrees K from a mixture of 83% nitrogen, 10% ethane and 7% propane vented from a tank with an initial pressure of 300 atmospheres to ambient back-pressure is about 2.4 kJ/mol of gas mixture, which translates to a refrigeration effect of about 71.4 kJ/kg. By increasing the tank pressure to 1,000 atmospheres (14,300 psi) the refrigeration effect is expected to increase significantly (possibly by as much as three-fold).

As a result, there is a need for rugged, energy efficient, light-weight, inexpensive HAP-SSL cooling systems because of the large quantities of heat that are released during lasing.

SUMMARY

Systems and methods are disclosed herein to provide thermal management for a laser system. More specifically, in accordance with an embodiment of the present disclosure, a laser thermal management system comprises a thermal management assembly and a laser gain assembly. The laser gain assembly comprises a laser gain medium and one or more laser pump diodes. The thermal management assembly comprises a high pressure gas tank fluidly connected to an open cycle Joule-Thompson refrigerator adapted for receiving high pressure gas from the tank and cooling the gas, and a reservoir fluidly connected to the Joule-Thompson refrigerator. The reservoir is adapted to receive at least partially condensed gas from the Joule-Thompson refrigerator. All or portions of the laser gain assembly are in good thermal contact with the reservoir. The laser gain assembly comprises a laser gain medium and one or more laser pump diodes. The reservoir is adapted to vent gases evaporating as a result of heat exchanged between the laser gain assembly and the reservoir.

In accordance with another embodiment of the present disclosure, a laser thermal management system comprises a thermal management assembly and a laser gain assembly. The thermal management assembly further comprises a high pressure gas tank fluidly connected to an open cycle Joule-Thompson refrigerator, a reservoir fluidly connected to the Joule-Thompson refrigerator, a first heat exchanger, and a second heat exchanger fluidly connected to the first heat exchanger via fluid transfer tubes and a fluid pump. The Joule-Thompson refrigerator is adapted for receiving high pressure gas from the high pressure gas tank and cooling the gas, and wherein at least a portion of the gas condenses as a result of cooling. The reservoir is adapted to receive at least partially condensed gas from the Joule-Thompson refrigerator. The first heat exchanger is in good thermal contact with the thermal management assembly, preferably in good thermal contact with the reservoir of the thermal management assembly. The second heat exchanger is in good thermal contact with the laser gain assembly. Gas in the reservoir evaporating as a result of heat exchanged between the first heat exchanger and the reservoir, and between the laser gain assembly and the second heat exchanger, is vented from the reservoir.

In accordance with another embodiment of the present disclosure, a method of laser thermal management comprises feeding a high-pressure gas from a tank through a filter and a dryer to remove moisture and particulates. The high-pressure gas is passed through a heat exchanger to cool and partially liquefy to a condensate the gas by iso-enthalpic expansion. The cold gas and condensate are passed to a reservoir in good thermal contact with all or portions of a laser gain assembly. Gas evaporating from the condensate in the reservoir as a result of heat exchange between the reservoir and the laser gain assembly is vented from the reservoir.

In accordance with another embodiment of the present disclosure, a method of laser thermal management comprises feeding a gas from a high-pressure gas tank through a filter and a dryer to remove moisture and particulates. The dry and filtered high-pressure gas is passed through a heat exchanger to cool and partially liquefy to a condensate the gas by iso-enthalpic expansion. The cold gas and condensate are fed to a reservoir in good thermal contact with a first heat exchanger, wherein the first heat exchanger is fluidly connected to a second heat exchanger via fluid transfer tubes and a fluid pump. Cold fluid from the first heat exchanger is pumped to the second heat exchanger. The second heat exchanger is in good thermal contact with the laser gain assembly. Warm fluid from the second heat exchanger is returned to the first heat exchanger, via the fluid pump in a closed loop. Gas evaporated from the condensate in the reservoir, resulting from heat exchange between the reservoir and the first heat exchanger, is vented from the reservoir.

The scope of the disclosure is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Contemporary TMSs for HAP-SSL include evaporative cooling with expendable coolant (U.S. Pat. No. 7,058,100). Water evaporative TMSs have also been demonstrated for other applications. One limitation of water evaporative TMS is that water (which is environmentally the most desirable coolant) freezes at 0 degrees C. and boils at 100 degrees C. at sea level, which limits thermodynamic heat exchange efficiency. Furthermore, it requires lasing in a higher temperature range, which limits lasing efficiency. Raising the boiling point of the liquid coolant above that of liquid nitrogen or argon, but yet still well below that of water may significantly improve cooling and lasing efficiency.

In a Joule-Thompson open-cycle refrigerator, gas in the refrigerator system is disposed of during the cooling process, and not re-cycled. Furthermore, no mechanical work is done in the cooling process. The meaning of the term refrigerator is used in its broadest sense, i.e., an apparatus for removing heat from and cooling a medium, in this case by using a cold partially condensed gas.

Figure 1:
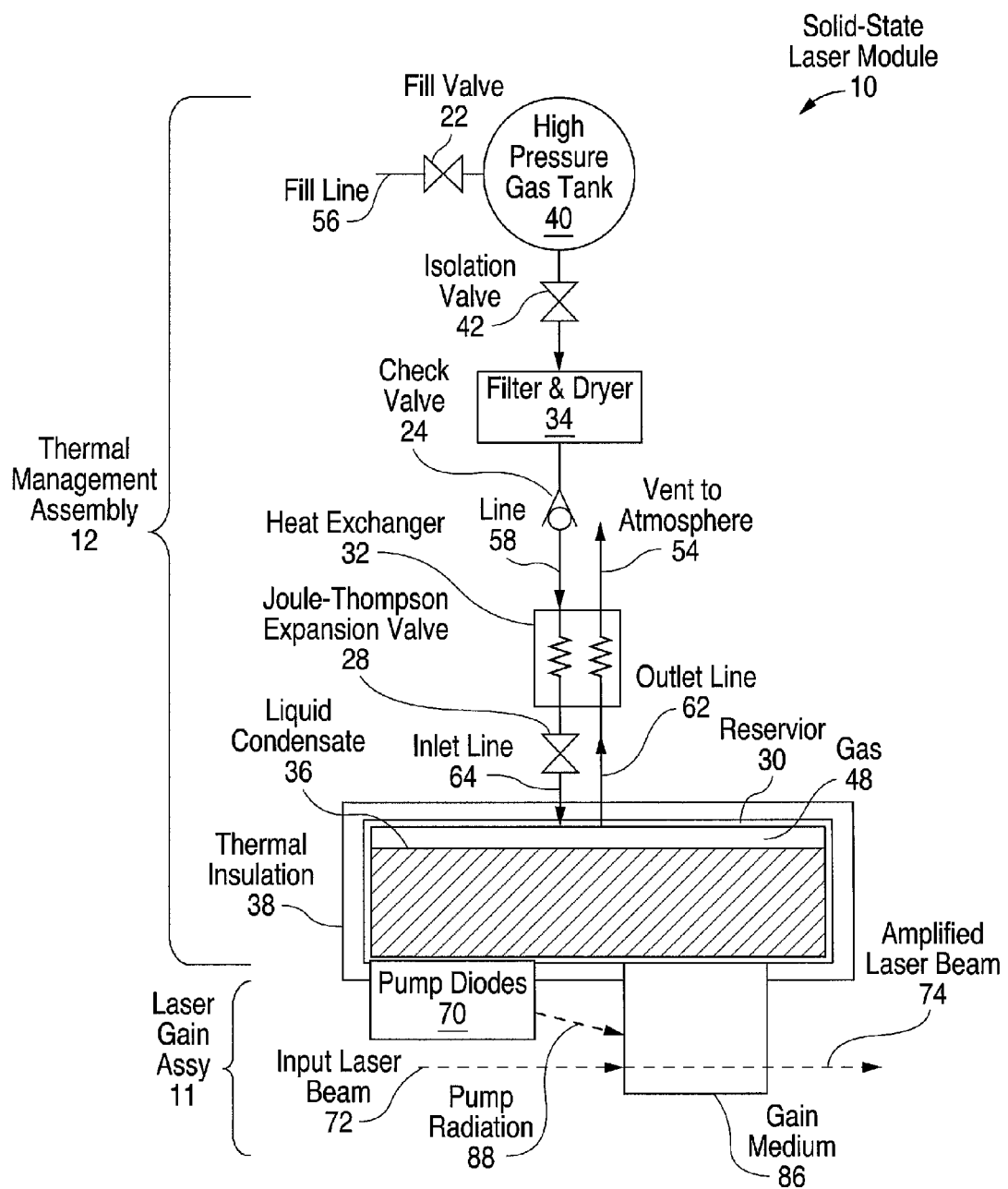
FIG. 1 shows a block diagram illustrating a thermal management system in accordance with an embodiment of the disclosure.

Referring to FIG. 1, a SSL/TMS module 10 is shown in accordance with a first embodiment. The SSL/TMS module 10 generally comprises a thermal management assembly 12 and a laser gain assembly 11.

Thermal management assembly 12 further comprises a tank 40 filled with suitable gas at high pressure, a fill line 56, a fill valve 22, isolation valve 42, filter and dryer 34, a check valve 24, a counter-flow heat exchanger 32, a Joule-Thomson expansion valve 28, an inlet line 64, a reservoir 30, an outlet line 62, a vent line 54, and a plurality of interconnecting lines, fluid seals, and controls (not shown). Counter-flow heat exchanger 32 cools the high pressure gas to a limited extent. The main purpose is to exchange heat with gas returning from reservoir 30 via outlet line 62 which is still colder than the incoming high pressure gas, so that the return gas is warmed to near ambient temperature before exiting vent line 54.

Tank 40 is normally maintained at ambient temperature with the gas therein being at a pressure typically in the range 1000 to 10,000 psi of clean, dry gas. Preferably, high pressure gas tank 40 is a light-weight, filament-wound tank with an internal metal liner. Exterior walls of reservoir 30 may also have thermal insulation 38. Fill valve 22 is provided to allow filling of tank 40 with high-pressure gas. The high-pressure gas may be a pure gas or a mixture of gases which is chosen according to the desired refrigeration temperature. Examples of preferred pure gas include nitrogen and argon. Alternatively, a preferred gas mixture is a mixture of nitrogen, ethane and propane, most preferably in a composition consisting essentially of 83% nitrogen, 10% ethane and 7% propane, which has a higher boiling point than nitrogen or argon, alone. Preferably, a small amount of Halon™ (CBrF3) may be added to the mixture to render the mixture non-flammable. Additionally, penthane may be included in the gas composition, because it, too, has a higher boiling point than liquid nitrogen.

Many applications require lasing events 5 to 10 seconds long and such lasing events may be repeated 10-20 times or more, depending on the amount of gas stored in high pressure gas tank 40. Isolation valve 42 can be actuated electrically, pyrotechnically, or by other means.

Laser gain assembly 11 further comprises a gain medium 86 and one or more laser pump diodes 70, where each may be in good thermal contact with the interior of reservoir 30. Gain medium 86 is adapted to receive pump radiation 88 from pump diodes 70 and an input laser beam 72. Gain medium 86 is further adapted to transmit an amplified laser beam 74. Laser gain medium 86 can be formed in arbitrary shape but preferred shapes include a rod, disk, and a slab. Laser gain medium 86 can be made of any suitable laser material, such as single crystal yttrium aluminum garnet (YAG), polycrystalline YAG, yttrium lithium fluoride (YLF), and gallium gadolinium garnet (GGG). In each case laser gain medium may be doped with suitable lasing ions such as Nd, Yb, Ho, Tm, and Er. Alternatively, the laser gain assembly may comprise other laser gain systems.

Just prior to lasing, isolation valve 42 is opened and high-pressure gas from tank 40 is fed through isolation valve 42 into filter and dryer 34, where particulates and moisture are removed from the flow. While the gas in tank 40 should be clean and dry, final particulate removal may be accomplished, for example, using a standard micro-porous filter, and residual moisture may be removed with, for example, with the aid of a desiccant. High-pressure gas free of moisture and particulates is then fed through check valve 24 and line 26 into counter-flow heat exchanger 32. As the gas passes through counter-flow heat exchanger 32 it is progressively cooled while experiencing only a very small pressure drop.

Cold high pressure gas from counter-flow heat exchanger 32 is fed into Joule-Thomson expansion valve 28, where it undergoes iso-enthalpic expansion that liquefies at least some of the gas. As is well known to those skilled in the art, a Joule-Thompson valve is usually a porous plug or a capillary which vents gas under high friction conditions. The resulting mixture of liquid (condensate)36 and cold gas 48 is fed into reservoir 30. Condensate 36 collects in the lower part of reservoir 30 while cold gas is fed through outlet line 62 to counter-flow heat exchanger 32.

Upon passing through counter-flow heat exchanger 32 the gas is gradually warmed to near-ambient temperature and is then vented into the atmosphere or open space through vent line 54. This has the added effect of bringing the vented gas closer to ambient temperature, reducing the differential thermal signature of the gas relative to the external environment.

Liquid condensate 36 is collected in reservoir 30. Gain medium 86 and pump diodes 70 are in a good thermal communication with liquid condensate 36, and are cooled by it. In particular, heat from gain medium 86 and diodes 70 causes some of the condensate liquid 36 to evaporate. Gas produced by evaporation of condensate 36 is removed from reservoir 30 through outlet line 62. It should be noted that only a fraction (typically 8-20%) of gas 48 passing through Joule-Thompson valve 28 is liquefied.

Figure 2:
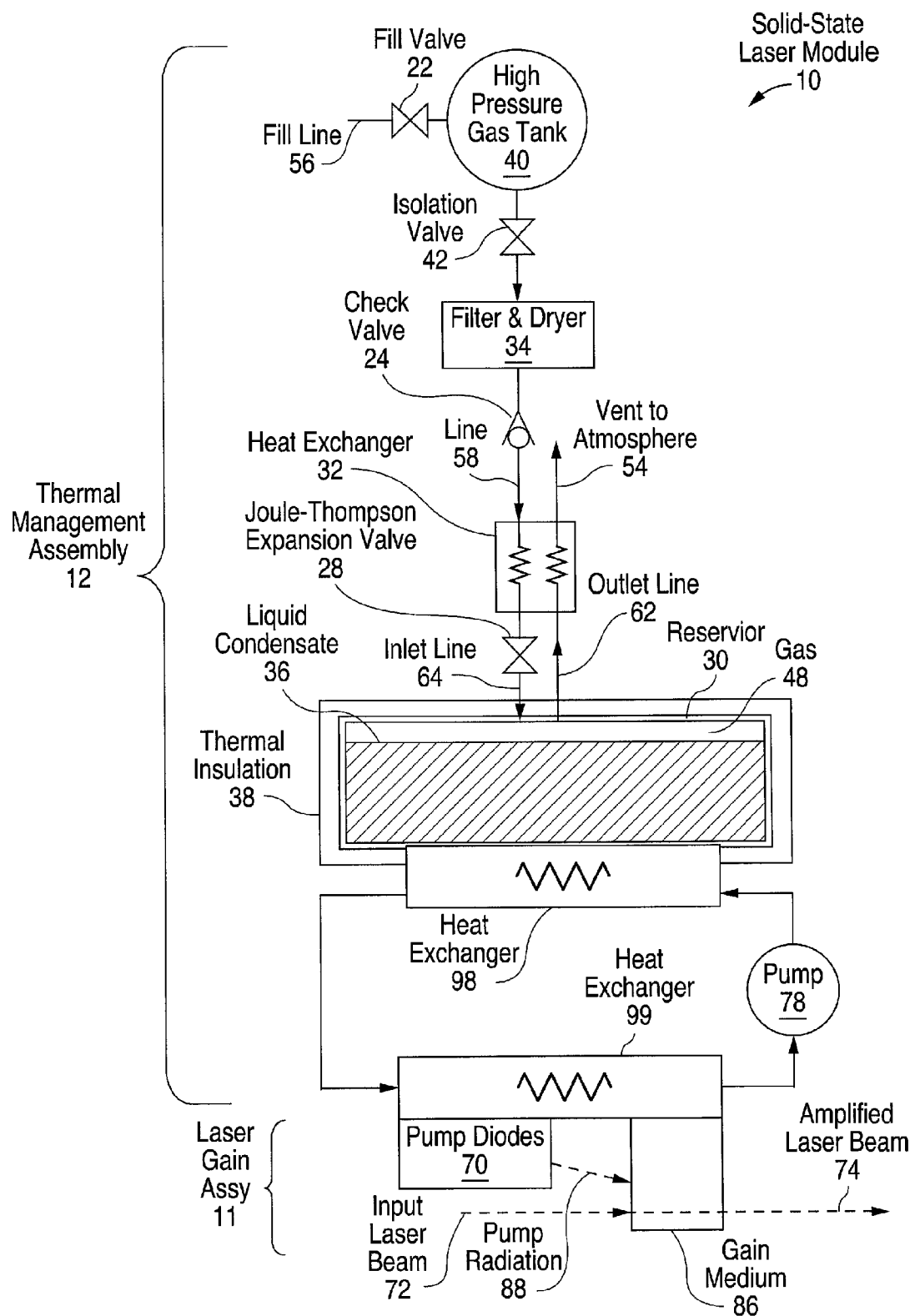
FIG. 2 shows a block diagram illustrating a thermal management system in accordance with another embodiment of the disclosure.

FIG. 2 shows a second embodiment, thermal management assembly 12 further including a liquid cooling loop having a pump 78, a heat exchanger 98 in a good thermal contact with reservoir 30, and a heat exchanger 99 in good thermal contact with gain medium 86 and/or one or more pump diodes 70. During operation, pump 78 pumps liquid around the loop which results in transporting heat from gain medium 86 and laser pump diodes 70 to reservoir 30, and chilled liquid back to gain medium 86 and laser pump diodes 70. The liquid used in the cooling loop may preferably be selected to remain in a liquid state throughout. This is dependent on both the liquid mixture, the circulation rate of pump 78, and the operating temperature of laser gain medium 86, which is preferably lower than the liquid boiling point.

Construction of high efficiency heat exchangers 98 and 99 with low thermal mass and capable of handling high throughputs has become possible by means of photolithographic fabrication which is conducive to manufacturing highly efficient miniature heat exchangers for Joule-Thompson cryogenic coolers. Because of their low thermal mass, such devices are capable of rapid cool-down (on the order of several seconds).

Alternatively, a variant of the TMS may use a plurality of such miniature heat exchangers and Joule-Thompson valves fed by a single high pressure gas tank 40 and connected to a single reservoir 30. This approach offers significant advantages over a single high-capacity heat exchanger and Joule-Thompson valve system.

The following example illustrates the technological benefits of one of the embodiments:

EXAMPLE

A Joule-Thompson Cooler for HAP-SSL Laser

A 100 kW HAP-SSL firing 5 second (500 kJ) shots requires about 1,500 kJ of heat removal per shot. Assuming an average refrigeration effect of about 150 kJ/kg, a suitable TMS, in accordance with the teaching of the subject disclosure, may use a 4 liter tank to store a nitrogen-ethane-pentane gas mixture at 1,000 atmospheres. Such a tank would be about 8" in diameter and weigh about 7 kg full (wet). The total wet weight of the refrigeration system (including isolation valve, heat exchanger and J-T valve) for one shot would be about 8 kg. A TMS for a HAP-SSL capable of firing twenty (20) 5-second shots would weight only 160 kg, which is considerably less than TMSs of contemporary configurations.

Innovations in Joule-Thompson cryogenic coolers include high efficiency heat exchangers fabricated by photolithography, and the use of mixtures of gases rather than pure gases. Additionally, photolithographically produced heat exchangers are characterized by small size, low thermal mass, and low cost. Owing to low thermal mass, these heat exchangers have demonstrated a capability for rapid cool-down from ambient temperature to 80 degrees Kelvin in several seconds.

Recent experiments have demonstrated that mixing a small amount of high boiling point gases such as ethane or propane with nitrogen or argon can increase the Joule-Thompson refrigeration effect by a factor of 2 to 10, and adding a small amount of Halon™ (CBrF3) renders the mixture non-flammable.

Light-weight, high-pressure tanks such as those required for storage of refrigerant in the subject disclosure have been developed for numerous commercial and aerospace applications. A typical tank of this kind has a thin internal metal shell reinforced by externally wound fiberglass filament. Such tanks are commercially available and are also qualified for military use in airborne and space applications. The expected lifetime of charged high-pressure tanks is over 10 years.

Solid-state lasers (SSLs) have been used in military and commercial applications since the early 1960's. Pumping of solid-state lasers by semiconductor laser diodes is a mature technology. Semiconductor laser diodes are readily available commercially.

Embodiments described above illustrate but do not limit the disclosure. It should also be understood that numerous modifications and variations are possible in accordance with the principles of the present disclosure. Accordingly, the scope of the disclosure is defined only by the following claims.

We claim:

1. A laser thermal management system, comprising:
   a thermal management assembly, comprising:
   an open cycle Joule-Thompson refrigerator adapted for receiving high pressure gas and cooling the gas;
   a reservoir disposed in fluid communication with the Joule-Thompson refrigerator, the reservoir being adapted to receive at least partially condensed gas from the Joule-Thompson refrigerator;
   a laser gain assembly disposed in thermal communication with the thermal management assembly; and,
   wherein the reservoir is adapted to vent gases evaporating as a result of heat exchanged between the laser gain assembly and the thermal management assembly.

2. The system of claim 1, further comprising a high pressure gas tank disposed in fluid communication with the Joule-Thompson refrigerator.

3. The system of claim 1, wherein the laser gain assembly further comprises a laser gain medium.

4. The system of claim 3, wherein the laser gain assembly further comprises one or more laser pump diodes.

5. The system of claim 1, wherein the laser gain medium is disposed in thermal communication with the thermal management assembly.

6. The system of claim 1, wherein the one or more pump diodes are disposed in thermal communication with the thermal management assembly.

7. The system of claim 1, wherein the laser gain medium is disposed in thermal communication with the reservoir.

8. The system of claim 1, wherein the one or more pump diodes are disposed in thermal communication with the reservoir.

9. The system of claim 1, wherein the thermal assembly further comprises:
   a first heat exchanger disposed in thermal communication with the reservoir;
   a second heat exchanger; and, a pump fluidly connected between the first heat exchanger and the second heat exchanger and operable to re-circulate fluid between the two heat exchangers,
   wherein the pump and the first and second heat exchangers are connected in a closed fluid circulating loop.

10. The system of claim 9, wherein the laser gain medium is disposed in thermal communication with the second heat exchanger.

11. The system of claim 9, wherein the one or more pump diodes are disposed in thermal communication with the second heat exchanger.

12. The system of claim 2, wherein the high pressure gas tank contains gas at a pressure of at least 1,000 psi.

13. The system of claim 2, wherein the high-pressure gas tank contains gas selected from a group consisting of nitrogen, argon, ethane, pentane, and Halon™.

14. The system of claim 2, wherein said high-pressure gas tank contains a gas mixture consisting essentially of nitrogen, ethane, and pentane.

15. The system of claim 3, wherein the laser gain medium contains lasant ions selected from the group consisting of Nd3+, Yb3+, Ho3+, Tm3++, Er3+, and Ti3+.

16. The system of claim 3, wherein the laser gain medium is formed in the shape selected from the group consisting of a rod, a disk, and a slab.

17. A method of removing heat from a laser system, the method comprising:
    receiving high pressure gas into an open cycle Joule-Thompson refrigerator;
    cooling and partially condensing the gas with1 the Joule-Thompson refigerator;
    receiving the at least partially condensed gas into a reservoir of a thermal management assembly of the laser system; and,
    venting gases from the reservoir evaporating as a result of heat exchanged between a laser gain assembly of the laser system and the thermal management assembly,
    wherein the laser gain assembly is disposed in thermal communication with the thermal management assembly.

18. The method of claim 17, further comprising feeding the high-pressure gas through a filter and a dryer to remove moisture and particulates before cooling and partially condensing the gas.

19. The method of claim 17, further comprising exchanging heat generated by the laser gain assembly with the reservoir of the thermal management assembly, wherein the laser gain assembly is disposed in thermal communication with the reservoir.

20. The method of claim 17, further comprising:
    cooling a fluid in a first heat exchanger disposed in thermal communication with the reservoir of the thermal management assembly; pumping the cooled fluid to a second heat exchanger disposed in thermal communication with the laser gain medium with a pump via a closed loop connecting the first and second heat exchangers;
    cooling the laser gain assembly with the second heat exchanger; and,
    returning the fluid warmed by thermal contact with the laser gain assembly to the first heat exchanger with the pump via the closed loop.

21. A laser thermal management system, comprising:
    means for providing a high pressure gas;
    an open cycle Joule-Thompson refrigerator operable to cool and partially condense gas;
    means for receiving the cooled and partially condensed gas;
    means for disposing the cooled gas receiving means in thermal communication with a laser gain assembly; and,
    means for venting gases evaporating as a result of heat exchanged between the laser gain assembly and the cooled gas receiving means.

* * * * *